United States Patent Office 3,527,249
Patented Sept. 8, 1970

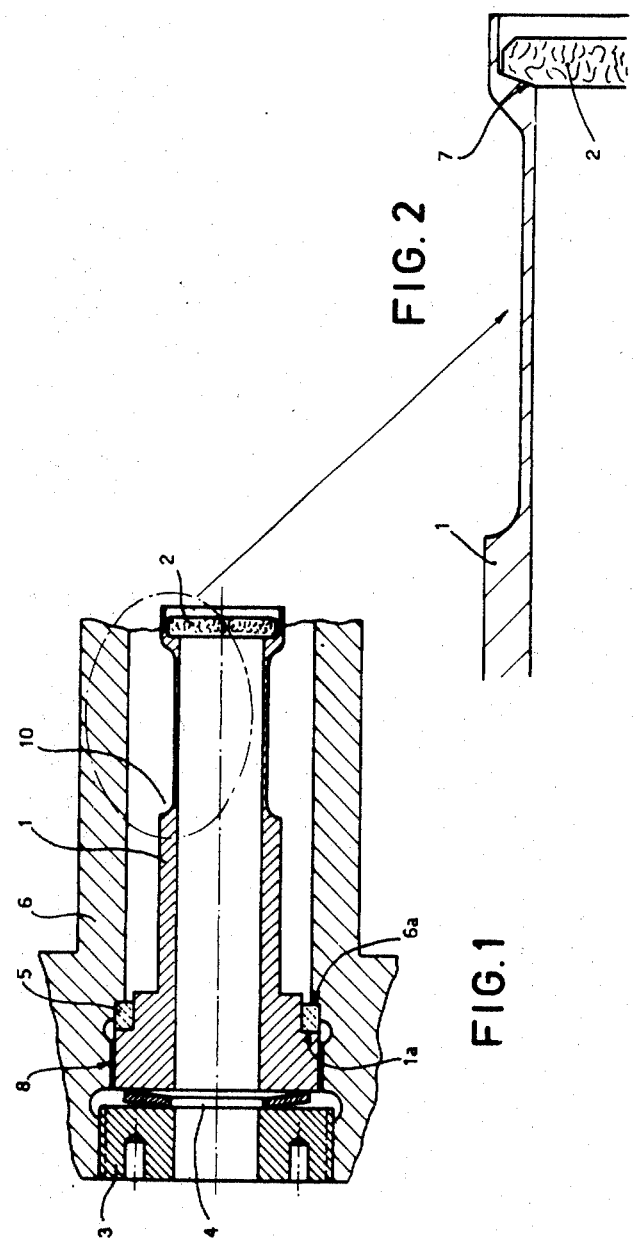

3,527,249
WINDOW ASSEMBLY FOR USE IN A SYSTEM FOR QUANTITATIVE DETERMINATION OF VAPOR CONCENTRATIONS IN A CARRIER GAS
Luc Verheyden, Ispra, Klaus Klein, Taino, Varese, and Carlo Cappelletti, Varese, Italy, assignors to European Atomic Energy Community, Euratom, Brussels, Belgium
Filed Dec. 9, 1966, Ser. No. 600,452
Claims priority, application Germany, Dec. 20, 1965,
E 32,702
Int. Cl. F16d 3/00; B23k 31/02; F16l 5/00
U.S. Cl. 137—559
3 Claims The invention relates to a window assembly for use in a system for quantitative determination of the concentration of vapours in a carrier gas, more particularly vapours which absorb ultra-violet light. The assembly is especially suitable for use in monitoring the leakage from a flow of liquid, and is based on the principle of measuring the light absorption in gases.

In liquid circuits containing packing glands or like devices, liquid must of course be expected to leak out through the packing. It is sometimes desirable to measure and monitor the leakage and to introduce a corresponding quantity of liquid into the circuit. This applies especially to nuclear reactors, where the circulation of liquid through the core has a considerable effect on their behaviour and safety. Another reason for careful monitoring of leakage is that the media circulating are often toxic or liable to explode.

Before the light absorption method can be used to determine the concentration, the liquid concerned must be converted into the gas phase. This may be done in a known manner by means of a dry carrier gas, inert as far as possible.

The liquid to be monitored may for example be a terphenyl mixture which can be used as coolant in a certain type of reactor. The carrier gas may be nitrogen.

The monitoring system with which the assembly is used may have a heated monitoring duct with laterally connected gas inlet and outlet lines and have quartz window assemblies before and after the inlet and outlet lines. Behind one window or lens is a source of ultra-violet light, behind the other a detector which responds to ultra-violet light and has an adjustable filter. The system is designed and intended for an operating temperature of about 450° C. and a pressure of 5 atm. It gives the absolute value for the quantity leaked, i.e., the concentration of the leaked liquid in the carrier gas.

In the operating conditions stated, satisfactory working of the system depends very much on the connection between the quartz window and the monitoring duct. The connection must withstand high temperatures and pressures and must be gas-tight.

The invention is concerned with a quartz window assembly which has proved to have the required operating properties. The assembly is characterised by a window holder tube made of an Fe-Ni-Co alloy which is suspended by one end in a stainless steel monitoring duct and whose wall thickness diminishes towards its free other end; by clamping means which engage the said one end of the holder tube in the axial direction of the duct wall and which counteract each other in respect of thermal expansion and by soldering of the quartz window to the free end of the holder tube on an annular surface sloping conically at an angle between 10° and 20°. Preferably, the clamping means are a brass screw plug with a steel cup spring and a silver ring, and the plug and spring press the holder tube on to the silver ring which is mounted loosely between shoulders on the tube and the duct wall. The quartz window may be a flat quartz disc, and the tube material may be of the substance having the trade name "Kovar."

In use assemblies constructed as above may be provided at the beginning and end of a monitoring duct with the windows facing each other.

Two features determine the resistance to temperature and pressure (e.g., shock pressure) of the connection between the window and holder tube: the type and execution of the soldering, and the conically sloping shape of the window or lens edge and of the associated contact surface on the holder tube.

Preferably the solder is ordinary sheathed wire with a nickel core and an Ag-Cu sheathing, Ag-Cu being present in a eutectic relationship (28% to 72%) with a Ti-content between 3 and 8%. For soldering the wire is laid in the join between the edges of the window and the holder tube, i.e., in a groove consisting of a sloping surface on the outer face of the quartz plate and the projecting edge of the holder tube. Soldering then takes place, in accordance with the invention, as follows: in a vacuum over ($10^{-4}$ torr) the wire and join are heated gradually for about 30 minutes until the sheathed wire melts (at about 820° C.). The quartz lens is advantageously weighted during this operation. The molten solder is stabilised for about 10 minutes at the melting temperature. During this time it penetrates into the join, moistens the contact surfaces on the lens and tube and connects the two together. The soldered connection is then allowed to cool slowly in the oven for about 2 hours.

The soldering operation described is intended primarily to connect the window and holder tube mechanically. However, it is also important that the connection should be gas-tight. For safety's sake, therefore, the first soldering operation is followed by a second soldering operation of the same type, which is possible because of the shape and dimensions chosen for the connecting elements. A gas-tight join is then ensured. The conical form of the window edge and of the associated contact surface on the "Kovar" tube takes into account the radial and axial expansion of the lens and tube and provides effective moistening of the contact surfaces. "Kovar" was chosen because of all appropriate metal substances it had the thermal coefficient of expansion nearest to that of quartz. Alternatively, substances with the trade names "Rodar" and "Vacon" might be used instead of "Kovar."

Between the window edge and the holder tube there is at first a gap of about 0.03 mm. which allows the shrinkage stresses to be checked and which fills with solder, forming a buffer ring about 0.5 mm. in height. In the conically sloping join between the lens and tube another bed of solder forms which connects best as regards moistening and pressure resistance at a slope angle of 15° to the horizontal. The angle should be between 10° and 20°.

The connection between the holder tube and the wall of the monitoring duct must be resistant to temperature and pressure and must be gas-tight in the same way as the window connection. These requirements are met by the cooperation and the action of the clamping means mentioned on the "Kovar" tube and the monitoring duct wall. The cooperation takes advantage of the different thermal coefficients of expansion of the materials concerned at the operating temperature mentioned. An explanation will now be given.

The clamped end of the "Kovar" tube has a collar by means of which it is gripped between the brass plug and silver ring and clamped to the monitoring duct. The brass plug (by way of the cup spring) pushes the collar on to the silver ring, whereas the latter urges the collar back. Since the plug has higher thermal expansion than the material of the duct, it also seals off the duct join. The silver ring, which also expands more than the materials of the holder tube and duct, is held immovable in shoulders on the "Kovar" tube and duct wall and seals the duct join off from the "Kovar" tube.

A specific embodiment of a quartz windows assembly according to the invention will now be described in more detail with reference to the accompanying drawings, in which:

FIG. 1 is a longitudinal section through the quartz window,

FIG. 2 shows a detail of the assembly ringed in FIG. 1, on a larger scale, and

Figure 3:
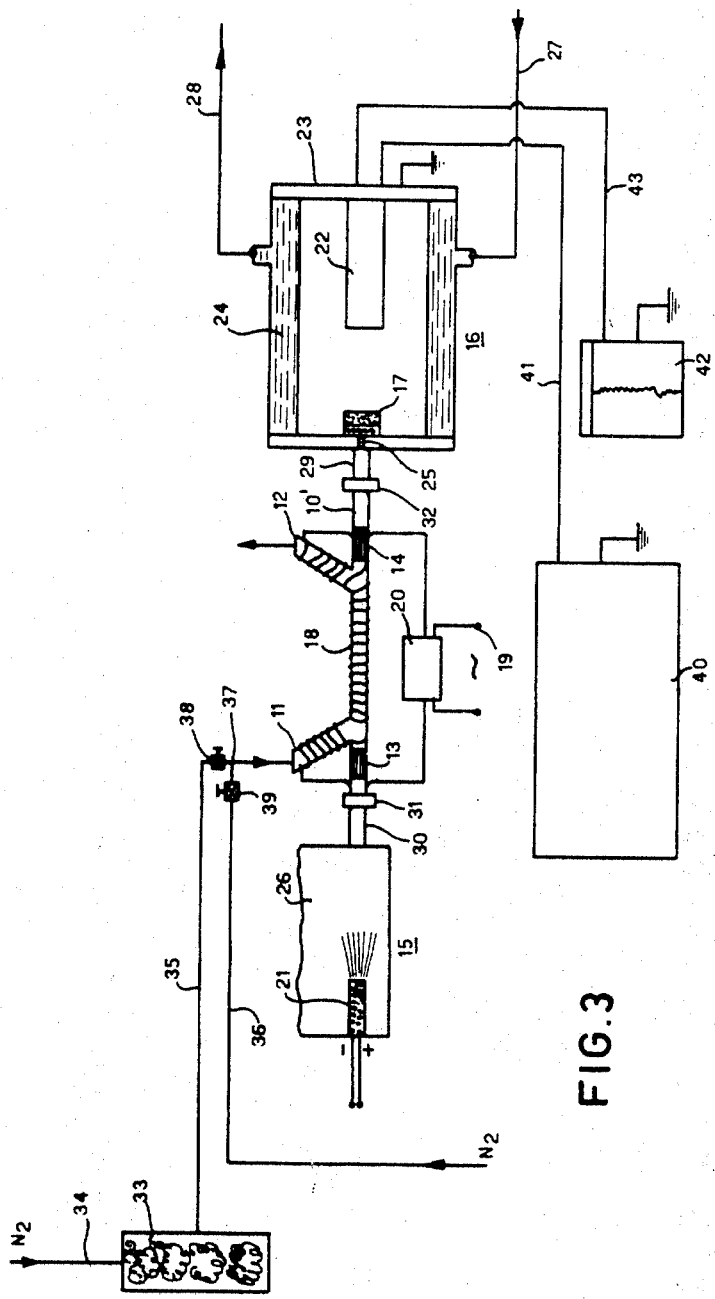
FIG. 3 is a diagram of a system for monitoring the leakage in a coolant circuit containing the assembly.

The quartz window assembly shown in FIGS. 1, 2 consists of a "Kovar" holder tube 1, a quartz disc 2 acting as a window, a brass screw plug 3, a cup spring 4 made of "Inox," a silver ring 5 and a monitoring duct 6 made of "Inox." The quartz disc slopes conically at its edge (FIG. 2) to mate with bearing surface 7 of the holder tube which also slopes. The angle of slope is 15°. Between the quartz disc and the edge of the holder tube there is a gap measuring 0.03 mm. to 0.5 mm. The internal diameter of the monitoring duct is 20 mm., that of the holder tube 9 mm. The holder tube is about 50 mm. long and the quartz disc is about 2 mm. thick. When expanded due to temperature, the brass plug and silver ring clamp the holder tube fast in the monitoring duct by means of its collar 8. The silver ring is gripped loosely by the shoulders 1a, 6a on the holder tube and monitoring duct.

A recess 10 in the wall of the holder tube serves to reduce and equalise thermal stresses in the material so that the attitude of the quartz disc remains the same. The thinnest part of the tube wall is about 0.5 mm. thick. The holder tube and quartz disc are soldered alone in an oven in a vertical position by the method described above. The quartz disc must be polished to optical quality before soldering, and all the components to be connected are preferably degreased and purified by ultrasonic vibration in acetone.

For the sake of better comprehension FIG. 3 shows a system using the quartz window assembly described. It is a leak measuring system connected to the coolant circuit of a nuclear reactor in which a terphenyl mixture is heated to 420° C.

The system has a monitoring duct 10' of "Inox" with laterally connected gas inlet and outlet lines 11, 12 and quartz window assemblies 13, 14 as described above in the portion of duct upstream and downstream of the inlet and outlet lines. An ultra-violet light source 15 is connected to one end of the monitoring duct, and a detector 16 which responds to ultra-violet light and has an adjustable filter 17 is connected to the other end.

An electrical heating coil 18 is mounted on the monitoring duct and the connections for the inlet and outlet lines, and is supplied from the mains 19 by way of an adjustable transformer 20. By heating it prevents the terphenyl mixture in the monitoring duct from condensing and so keeps the quartz windows free of any deposit.

The ultra-violet light source is a mains-fed 4-watt TUV lamp 21, and the ultra-violet-sensitive detector is a photocathode tube 22 free-standing in the detector housing 23 and coaxial with the monitoring duct. The housing has a flowing-water cooling jacket 24. In the portion of the wall in front of the filter 17 there is an adjustable orifice 25. The interiors of the housing 23 and the ultra-violet lamp housing 26 are blacked. The cooling jacket is connected into a circuit by inlet and outlet lines 27, 28.

Tubing 29 in front of the orifice 25 connects the monitoring duct 10 to the detector housing 23 and corresponding tubing 30 is attached to the housing 26 for the ultra-violet light source. The monitoring duct is connected to the tubing 29, 30 by Leybold high-speed couplings 31, 32.

FIG. 3 also shows a storage tank 33 for the liquid which has leaked and been vaporised, a line 34 for feeding the protective gas—also nitrogen—to the storage tank, a line 35 for passing the leaked liquid from the storage tank 33 to the monitoring system and a line 36 for feeding the carrier gas into the monitoring system. Two "dilo" valves 38, 39 are connected into the lines 35, 36, which meet at 37.

The electronic part of the system includes a stabilised high-tension source 40 for the photocathode tube, its supply line 41, a pen recorder 42 and a supply line 43 for the latter.

Leakage is determined on the basis of the formula $I = I_0 \cdot e^{-E \cdot l \cdot c}$ in this formula:

$I_0$ is the intensity of the light when the monitoring duct is filled with $N_2$;

$I$ is the intensity of the light when the monitoring duct is filled with a mixture;

$l$ is the length of the gas-liquid phase in the monitoring duct (measured between the windows);

$c$ is the concentration of leaked liquid absorbed in the gas; and $E$ is the light absorption constant of the leaked liquid.

Of these factors values $I$ and $I_0$ are obtained in the system. The value $l$ is given in the system constructionally and is inversely proportional to the smallest determinable concentration of leaked liquid. The photocurrent measured in the detector 15 is a measure of $I$ and $I_0$, of which $I$ is displayed continuously on the recorder 42. The reading also takes value $E$ into account. The desired concentration of leaked liquid in the carrier gas is either calculated or obtained from the reading on the recorder 42 with the help of a calibrating sheet.

We claim:

1. A system for quantitative determination of the concentration of vapours in a carrier gas, comprising a quartz window assembly mounted within a window holder tube made of an Fe-Ni-Co alloy, said tube being suspended by one end in a stainless steel monitoring duct and having a wall thickness which diminishes towards its free other end, and including clamping means which engage the duct and the said one end of the holder tube in the axial direction of the duct wall, a quartz window being soldered to the free end of the holder tube along mating annular surfaces sloping conically at an angle of between 10° and 20°.

2. A system as claimed in claim 1, wherein the clamping means comprises a brass screw plug and a steel cup spring acting axially against one end of said tube, and a silver ring, which is mounted loosely between shoulders on the tube and the duct wall, said plug and spring pressing said tube axially against said ring.

3. A system as claimed in claim 1, characterised by a reduction in the thickness of the holder tube wall between the said one end and the quartz window.

References Cited

UNITED STATES PATENTS

| | | | |
|---|---|---|---|
| 2,632,431 | 3/1953 | Suter | 285—187 |
| 3,006,069 | 10/1961 | Rhoads et al. | 29—473.1 |
| 3,281,174 | 10/1966 | Heil | 29—473.1 XR |
| 3,302,961 | 2/1967 | Franklin | 29—473.1 |

FOREIGN PATENTS 696,438　10/1964　Canada.

OTHER REFERENCES

German printed application 1,088,199 (1960).

HENRY T. KLINKSIEK, Primary Examiner

U.S. Cl. X.R.

29—473.1, 476; 285—173, 187